Sept. 16, 1930.   N. GHERASSIMOFF   1,775,675
AUTOMATIC TRAIN SIGNALING DEVICE FOR LEVEL CROSSINGS
Filed Feb. 13, 1930   2 Sheets-Sheet 1

Inventor
Nicolas Gherassimoff
by Spear, Middleton, Donaldson & Hall
Attys.

Sept. 16, 1930.   N. GHERASSIMOFF   1,775,675
AUTOMATIC TRAIN SIGNALING DEVICE FOR LEVEL CROSSINGS
Filed Feb. 13, 1930   2 Sheets-Sheet 2

Inventor
Nicolas Gherassimoff
by Spear, Middleton, Donaldson & Hall
Attys

Patented Sept. 16, 1930

1,775,675

UNITED STATES PATENT OFFICE

NICOLAS GHERASSIMOFF, OF ASNIERES, FRANCE, ASSIGNOR TO SOCIETE D'AVERTIS-SEUR FERROVOIE, OF PARIS, FRANCE, A LIMITED LIABILITY COMPANY OF FRANCE

AUTOMATIC TRAIN-SIGNALING DEVICE FOR LEVEL CROSSINGS

Application filed February 13, 1930, Serial No. 428,175, and in France November 26, 1929.

The present invention relates to a device for automatically signaling the arrival of trains, in particular at level crossings, said device being characterized by the fact that it includes at least one optical or acoustical warning apparatus actuated by means of mechanical or electrical controlling means, which are either known or are part of this invention, by the vibrations produced in the rails by the rolling of a train.

The feature set forth above can give rise to numerous embodiments which may differ from each other in particular by the warning apparatus used which can be sonorous, luminous, combined, etc., and by the means enabling the noise to be transmitted from the train to the warning apparatus, or the vibrations of the rails to be transformed into electrical or sound vibrations, which apparatus and means may be of any kind without extending beyond the scope of the invention.

One embodiment of a warning device according to the invention consists in placing microphones near the permanent way, at required distances from the level crossing, and in transmitting the electrical vibrations produced by the microphones (preferably by wire and with or without amplification) to the optical or acoustical warning apparatus, which said electrical vibrations bring into operation.

According to another embodiment, use is made of the property of the rails of transmitting the vibrations produced by the passing of a train, and a microphone is placed at the level crossing, said microphone being subjected to the vibrations of the rails and controlling the warning apparatus. As in the preceding case, the electrical vibrations produced by the microphone may be suitably amplified.

It is preferable to house the microphones in chambers (underground, for example) which insulate them from sounds other than those due to the rolling of the train. When the microphones are placed at a certain distance from the rails, the vibrations of the rails may be transmitted to them by means, for example, of rods connected to the rails and coming into the immediate vicinity or even into contact with the microphones.

In order to enable the vibrations of the rails to better reach the microphone at the level crossing, said vibrations can be accentuated by means of resonators placed on the permanent way at suitable distances from the level crossing as also at the level crossing itself, the microphone then being subjected to the action of the latter resonator.

Said resonators are preferably composed of metal cylinders connected to the rails and accommodated, for example, in chambers arranged under the rails.

The transmission of the noise of a train may be still further improved by making the rails act upon electrical sound generators or amplifiers, which can co-operate with the resonators and which are placed, for example, within the latter.

Safety devices of any kind may be provided to warn the users of the road and the officials interested, of the failure of the warning device to work.

The placing of the warning devices at level crossings has been particularly considered in the foregoing, but such warning devices may, of course, be placed in any other places desired, such as railway stations or sections of the permanent way under repair. In the latter case, the microphone and the warning device proper, can be used in the form of portable apparatus which is subjected to the action of the rails at any place desired.

Other features and details of the invention will be apparent from the description which is about to be made in respect of the accompanying drawings, in which.

According to one embodiment of the invention, the rails 1 act on the microphones, 2, 3, 4 and 5 arranged at suitable distances from the level crossings, by means of rods or other acoustical conductors 2ª, 3ª, 4ª and 5ª, each microphone being connected in the ordinary way to an amplifier 6 arranged near the level crossing 7. It is obvious that the microphones could be placed near the path of the trains and in particular between the rails without having any connection with the latter.

At the approach of a train, the rails 1 transmit the noise of the rolling to the microphones, then to the amplifier, the intensity of the sound being in principle a function of the distance of the train from the microphones. An automatic warning device of great simplicity is thus obtained. It will be noted moreover in the embodiment adopted and according to the invention, that the microphones are placed in chambers 20, so that they are only influenced in principle, by the noise of the train reaching the microphones by the rods 2ª, 3ª, 4ª and 5ª.

Figure 3:
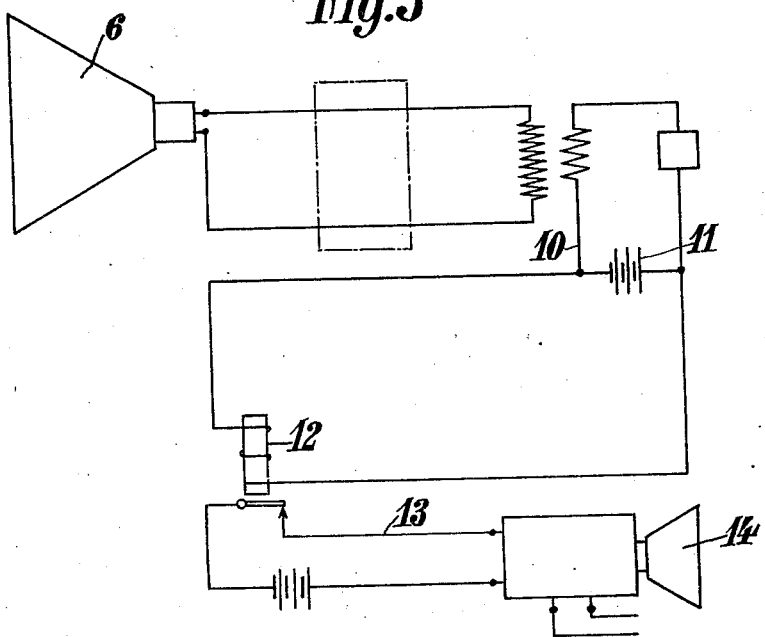
Fig. 3 is a diagrammatic view of an installation provided with a safety device.
Figure 4:
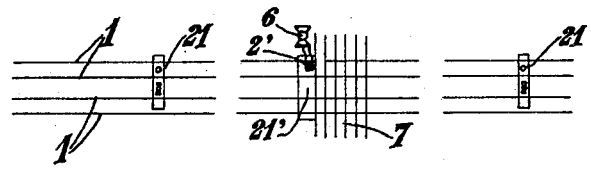
Fig. 4 is a diagrammatic plan of a railway, with a level crossing, provided with another modification of a warning device.

Fig. 3 shows diagrammatically an installation provided with a safety device enabling, in case of the apparatus not working, and more particularly in case of breakage of the circuit 10 or the wearing out of the supply battery 11 of this circuit, the stoppage of the warning device to be signaled at least to the users of the road.

For this purpose is placed, for example, in parallel, an electro-magnet 12 the armature 12ª of which regulates by its movements either an auxiliary circuit 13, or any suitable mechanical device putting into action, in a continuous manner, the amplifier 6 or any other auxiliary amplifier such as 14, as also signaling devices situated at the nearest railway station.

Any other safety device adapted to the embodiment shown which can obviously include numerous practical embodiments, could be used without departing from the scope of the invention.

Figure 1:
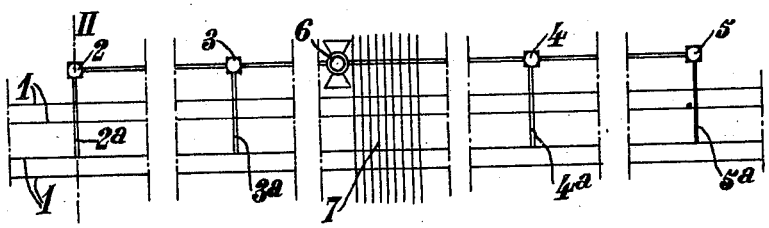
Fig. 1 is a diagrammatic elevation of a railway, with a level crossing, provided with a warning device according to the invention.
Figure 2:
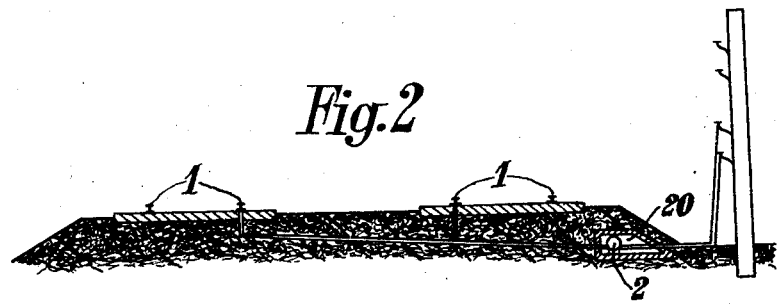
Fig. 2 is a section on a larger scale, along the line II—II of the preceding figure.

According to another embodiment, a microphone 2' placed at the level crossing is connected to the rail 1 in a manner similar to that shown in Fig. 2. Said microphone is connected similarly to a loud speaker 6 which can be arranged in any desired manner.

At a certain distance from the level crossing, are placed resonators 21. Said resonators, which are composed of sheet iron cylinders, are housed in concrete chambers 20 placed under the rails, across the permanent way. They are suspended to the rails by ties 22 and by rods or bolts 23. A similar resonator 21' is placed at the level crossing and still further intensifies the sounds reaching the microphone 2'.

Figure 5:
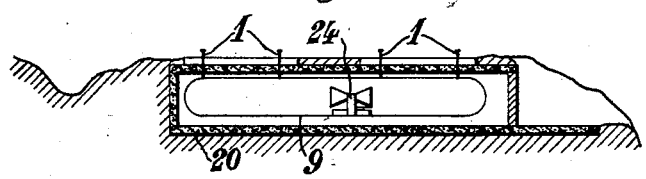
Fig. 5 is a cross section of the permanent way, taken through a resonator.
Figure 6:
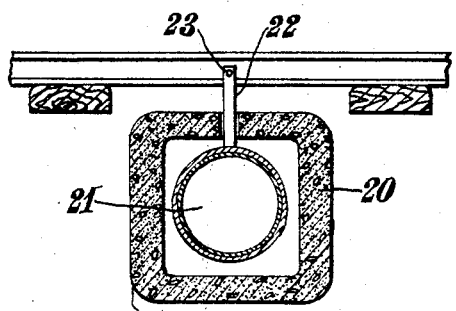
Fig. 6 is a cross section of the resonator, on a larger scale.
Figure 7:
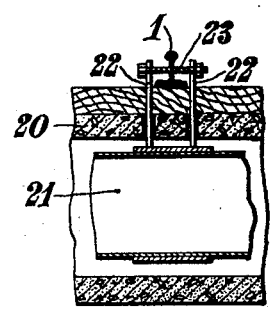
Fig. 7 is a partial longitudinal section corresponding to Fig. 6.

If the resonators do not intensify the noise so as to make it effective at a sufficient distance, an electrical amplifying apparatus 24, receiving its energy from a local battery, can be arranged, as shown in Fig. 5.

It has been assumed in the foregoing that the warning apparatus 6 is merely an amplifier or loud speaker intensifying the noise transmitted by the microphone. Any other kind of acoustical or optical warning device, either luminous or mechanical, could just as well be used. The electric currents produced by the microphones will then cause the operation of the said warning apparatus by means of relays and other suitable electrical or electro-mechanical controlling apparatus, well known in the telephonic art and in that of railway equipment and not being part of the invention.

The microphone and the warning device can be grouped in a portable unit which is placed at the spot where it is desired to be warned of the approach of a train. The microphone is placed in the immediate vicinity of a rail, and for this purpose the microphone support comprises some fixing means enabling it, for example, to be fixed rapidly on the flange of a rail or on a sleeper, or to be stuck into the ground. The warning device connected to the microphone by leads 9 in flexible casing, is placed at a certain distance from the permanent way, so as not to be struck by the train.

It is of course obvious that the device has only been described and represented herein in an explanatory, but in no way limitative manner, and that modifications of detail may be made thereto without departing from its spirit.

I claim:

1. Automatic railway signaling device, comprising in combination, a microphone located near a railway line and responsive to sound vibrations produced in the rails by the passage of a train, resonators for intensifying the sound impinging on said microphone, an electric circuit in which said microphone is mounted to modulate the current flowing therethrough, means located within said resonators for amplifying the modulated currents, and warning means actuated by said microphone, for reproducing at any desired spot the sound vibrations produced in the rails.

2. Automatic railway signaling device, comprising in combination, a microphone located near a railway line and responsive to sound vibrations produced in the rails by a passing train, resonators connected to the rails for intensifying the sound impinging on said microphone, an electric circuit in which said microphone is mounted to modulate the current flowing therethrough, means located within the said resonators for amplifying the modulated currents, and warning means mounted in said circuit for converting said current modulations into sound.

3. Automatic railway signaling device, comprising in combination, a microphone located near a railway line and responsive to sound vibrations produced in the rails by a passing train, a resonator connected to the rails for intensifying the sound impinging on said microphone, a chamber accommodating said resonator and said microphone, located below said rails and shielding said microphone from other vibrations, an electric circuit in which said microphone is mounted to modulate the current flowing therethrough, means located within said resonator for amplifying the modulated currents, and a loud speaker device mounted in said circuit for converting the current modulations into sound.

4. In an automatic railway signaling device, the combination of a microphone located near a railway line and responsive to sound vibrations produced in the rails by the passage of a train, a concrete chamber housing said microphone and located in the ground below said rails, means for connecting said microphone to said rails, said concrete chamber screening said microphone from other vibrations, an electric circuit in which said microphone is mounted to modulate the current flowing therethrough, means mounted in said circuit at a suitable distance from said microphone for converting said current modulations into sound, and means for signaling a break in the circuit connecting the microphone to the warning means.

5. In an automatic railway signaling device, the combination of a microphone located at a level crossing of a railway line and responsive to sound vibrations produced in the rails by the passage of a train, a loud speaker, an electric circuit in which said microphone and loud speaker are mounted, resonators placed at a suitable distance from said level crossing for intensifying the sound conducted by the rails to said microphone, and a resonator placed near said microphone, the latter modulating the current flowing in said circuit and said loud speaker converting said current modulations into sound.

NICOLAS GHERASSIMOFF.